United States Patent [19]
Nakamoto et al.

[11] Patent Number: 5,483,820
[45] Date of Patent: Jan. 16, 1996

[54] METHOD FOR ZERO CORRECTION IN TORQUE SENSOR

[75] Inventors: Akira Nakamoto, Osaka; Shiro Takada, Itami; Takuji Mori, Sakai, all of Japan

[73] Assignee: Kubota Corporation, Japan

[21] Appl. No.: 222,652

[22] Filed: Apr. 1, 1994

[30] Foreign Application Priority Data

| Apr. 6, 1993 | [JP] | Japan | 5-078413 |
| Apr. 6, 1993 | [JP] | Japan | 5-078414 |
| May 7, 1993 | [JP] | Japan | 5-106313 |
| May 7, 1993 | [JP] | Japan | 5-106314 |
| May 7, 1993 | [JP] | Japan | 5-106315 |
| Oct. 25, 1993 | [JP] | Japan | 5-265311 |

[51] Int. Cl.$^6$ .................................... G06F 15/20
[52] U.S. Cl. ......................................... 73/1 C
[58] Field of Search ........ 73/1 B, 1 C, 862.33–862.336; 364/571.01

[56] References Cited

U.S. PATENT DOCUMENTS

| 4,139,892 | 2/1979 | Gudea et al. | 364/567 |
| 4,930,095 | 5/1990 | Yuchi et al. | 364/571.01 |
| 4,976,133 | 12/1990 | Pohl | 73/1 C |

*Primary Examiner*—R. Raevis
*Attorney, Agent, or Firm*—D. Peter Hochberg; Mark Kusner; Michael Jaffe

[57] ABSTRACT

A method for zero correction in torque sensors, such as magnetostrictive torque sensor and strain gauge type torque sensor. Torque measurement is initiated when absolute values of torque signals are greater than a first set value, sampling measurement is carried out at predetermined intervals after the initiation. After absolute values of the measured torque signal values become lower than a second set value, an average value for a predetermined number of torque signal values whose absolute values are lower than a third set value is set as a new zero. The method permits proper measurement and correction of zero signals from torque sensors employed succesively at locations subject to impulse-like action of a torque load.

24 Claims, 15 Drawing Sheets

5,483,820

METHOD FOR ZERO CORRECTION IN TORQUE SENSOR

FIELD OF THE INVENTION

The present invention relates to a method for zero correction in torque sensors, such as magnetostrictive torque sensor and strain gauge type torque sensor.

BACKGROUND OF THE INVENTION

A magnetostrictive torque sensor has been known, for example, of the type having a torque detecting shaft formed on its outer periphery with a magnetically anisotropic portion, so that when a torque is applied to the shaft, any change in the permeability of the magnetically anisotropic portion can be detected by means of a coil provided adjacent the magnetically anisotropic portion. Such a magnetostrictive torque sensor involves a problem that when there arises a change in ambient temperature, a change with time, or the like in its sensor portion including the magnetically anisotropic portion formed on the shaft, an excitation circuit for exciting the coil, and a sensing circuit for processing a signal from the coil, any such change may be a cause of zero error occurrences in torque signal values.

Therefore, for purposes of correcting such zero error, a number of approaches has been proposed including one such that a torque signal value obtainable when no torque is applied to the torque sensing shaft, that is, a zero signal value is calculated and correction is made so that the zero signal value is lower than a predetermined value.

In mechanical areas, such as screw impulse tool, motor-powered screw tool, nut runner, screw machine, and torque tester for testing the performance of those tools, it has been proposed to incorporate a magnetostrictive torque sensor of the above mentioned type or the like for measurement of operating torque in terms of real time.

In screw impulse tools and the like, however, the problem is that since torque load does act in impulse fashion, it is difficult to select only such points of time at which the torque sensing shaft is loaded with no torque, when the tool is in intermittent operation, to calculate a torque signal value at such a point of time, that is, zero signal value.

DISCLOSURE OF THE INVENTION

Therefore, the present invention is directed to solving the foregoing problem and it is an object of the invention to enable proper calculation of the zero signal value of a torque sensor successively used at portions on which a torque load does act in impulse-like fashion, thereby to enable correction of any zero-point error with such a signal value.

In order to accomplish this object, a method for zero correction in a torque sensor is proposed, said method comprising;

initiating torque measurement when the absolute value of a torque signal exceeds a first preset value, making sampling measurement of torque signals for a predetermined time period after the initiation, averaging, after the absolute value of any sample measured torque signal value is found to be lower than a second preset value, a predetermined number of those of a plurality of sampled torque signal values which are lower than a third preset value, and setting the average value as a new zero.

According to this method, an average value obtained from a predetermined number of those of a plurality of sampled torque signal values measured after the application of a pulse-like torque and lower than a third preset value is set as new zero and there is no possibility that some of pulse-like torque waveforms are used in zero calculation. Therefore, a zero point can be acccurately calculated using only torque values available when torque is not acting. Since a plurality of torque signal values is averaged to obtain a zero point, the measurement is unlikely to suffer the effect of ripples present in torque signals, and this permits accurate zero-point setting. Further, since zero correction is made to obtain a new zero each time the waveform of a torque signal is output, any zero shift due to hysteresis and/or any zero drift due to changes in ambient temperature is cancelled.

DESCRIPTION OF EMBODIMENTS

Figure 2:
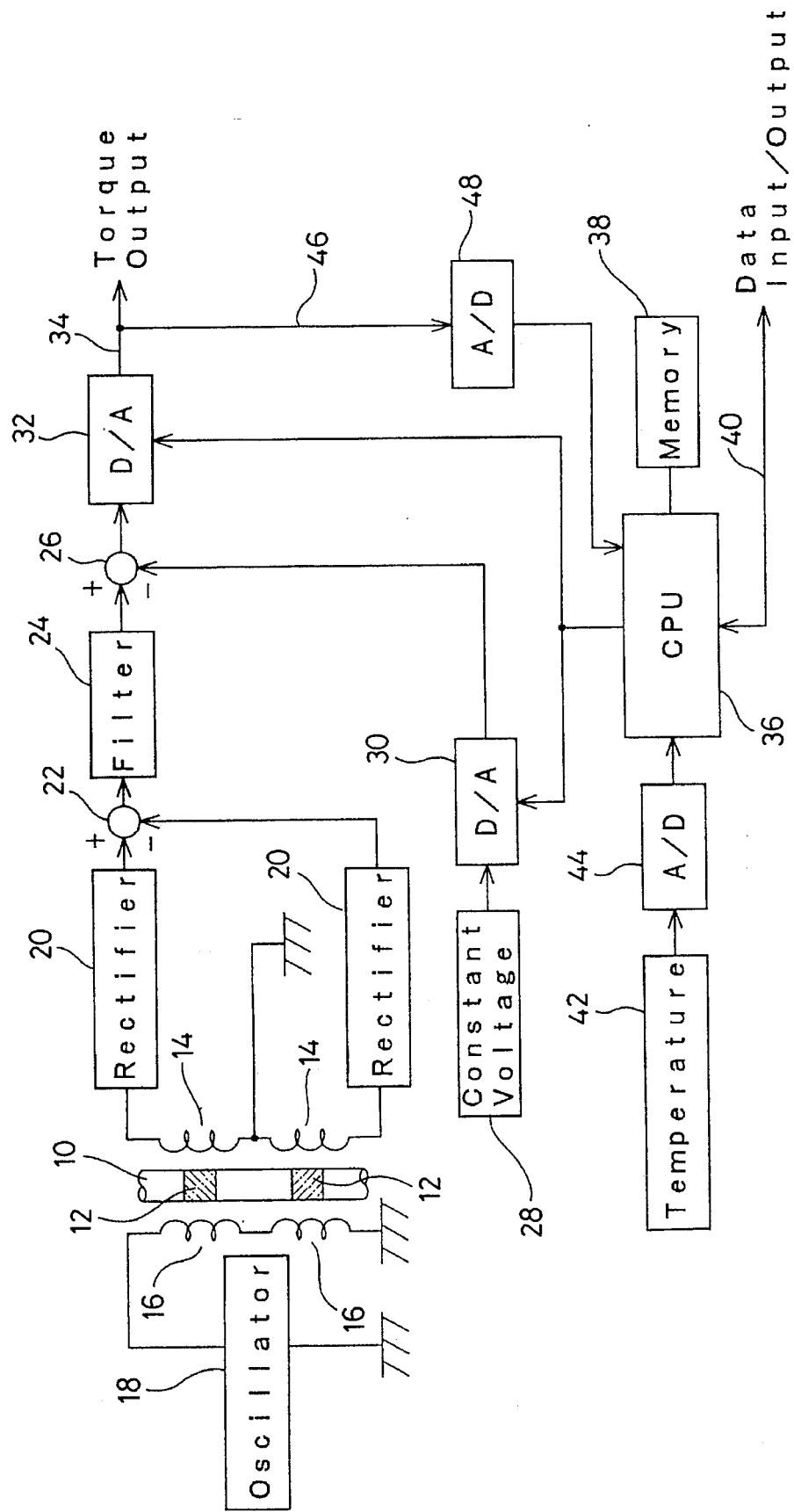
FIG. 2 is a diagram showing one example of circuit arrangement in a magnetostrictive torque sensor to which the invention is applied.
Figure 3:
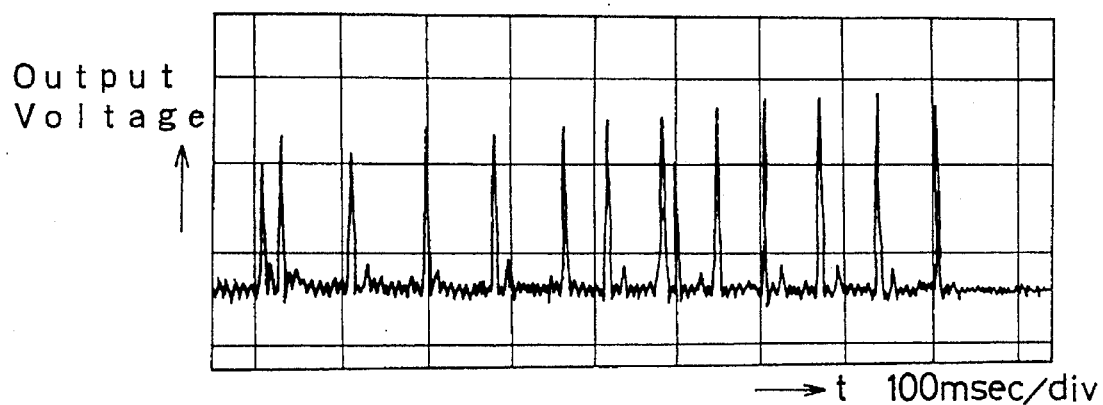
FIG. 3 is a diagram illustrating waveforms of torque signals from an impulse tool built-in type torque sensor.
Figure 4:
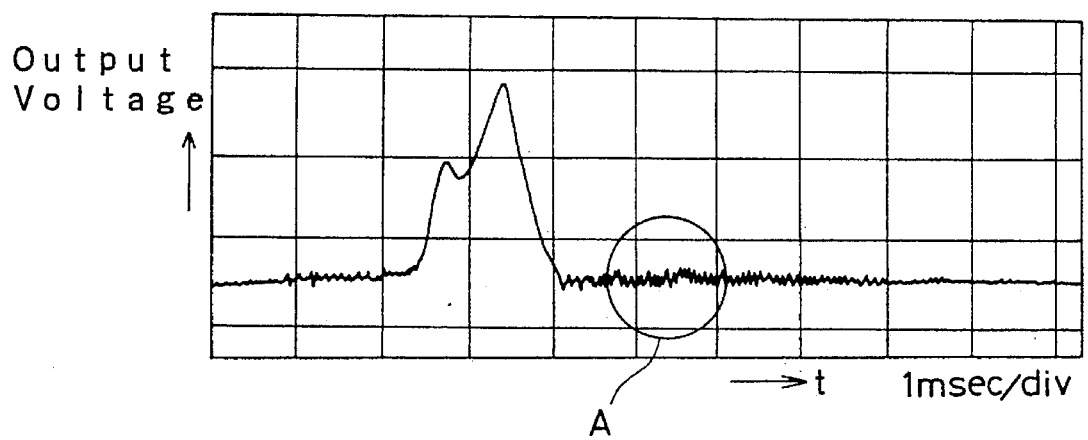
FIG. 4 is a diagram showing one waveform in FIG. 3 on an enlarged time scale.
Figure 5:
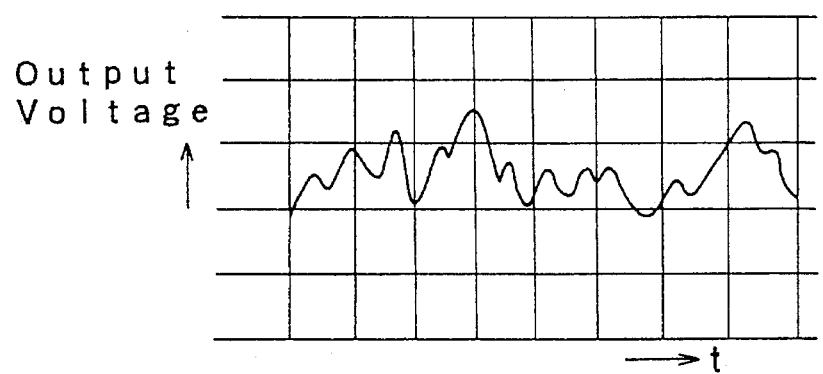
FIG. 5 is an enlarged view showing portion A in FIG. 4.

FIG. 3 illustrates waveforms of torque signal values at an impulse tool built-in type torque sensor. The ordinate axis represents signal output voltage. The transverse axis is time axis in terms of 100 msec/div. FIG. 4 shows one wave form in FIG. 1 on an enlarged time scale. The scale of the ordinate axis is same as that in FIG. 3, but that of the transverse axis is enlarged on a 1 msec/div basis. FIG. 5 shows portion A in FIG. 2, that is, a portion which is not acted upon by torque, on an enlarged scale for both ordinate and transverse axes. It can be seen that noise is present in the form of ripples.

Figure 1:
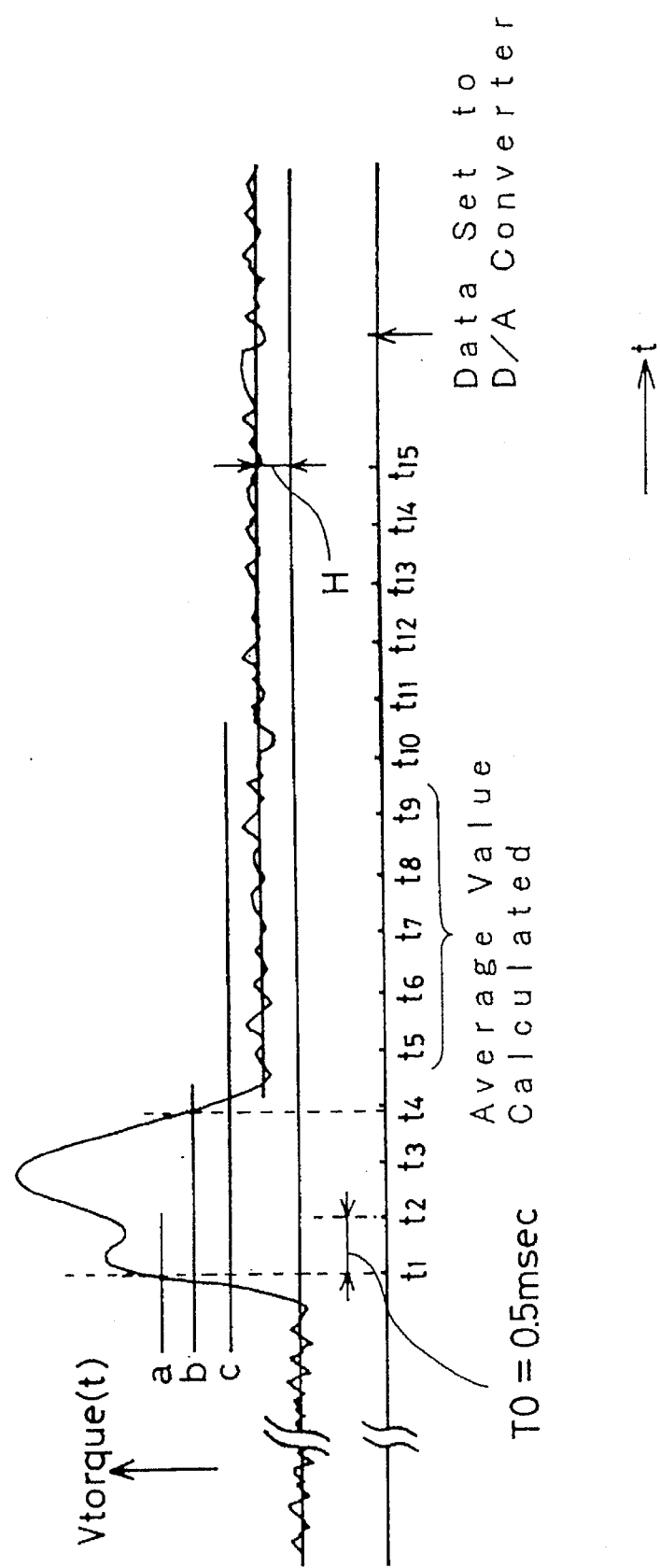
FIG. 1 is a diagrammatic view illustrating an aspect of zero fluctuations due to a deviation caused by hysteresis to a torque signal value at a point of time when any impulse-like torque is not applied, for explaining a first embodiment of the method for zero correction at torque sensor according to the present invention.

FIG. 1 shows a first embodiment of the method acccording to the invention. In FIG. 1, it is apparent that some deviation due to hysteresis H has occurred with torque signal values when any impulse-like torque is not applied. For ease of understanding, hysteresis H is shown in exaggeration, however. Unless zero correction is made at this point of time, an error will be caused to torque measurements.

Next, the method of zero correction will be described. Initially, a first set value a, a second set value b, and a third set value c are set with respect to the absolute value of torque signal value Vtorque(t). In this setting, a>b>c. Torque signal values will vary between positive and negative sides according to the direction of torque application.

When the absolute value of torque signal value Vtorque(t) goes up to more than first preset value a as a result of impulse-like torque application, torque measurement is initiated. Upon initiation of torque measurement, sampling measurement of torque signal value Vtorque(t) is carried out n times in succession for each predetermined time T0. Torque signal values in this case are taken as Vtorque($t_1$), Vtorque($t_2$), . . . , Vtorque($t_n$).

When the absolute value of torque signal value Vtorque(t) decreases to a value lower than the second set value b with time, j number of subsequent torque signal values (Vtorque ($t_i$), Vtorque ($t_{i+1}$), . . . , Vtorque ($t_n$) having an absolute value which are lower than the third set value c are averaged.

The average value is set as a new zero. By doing this way it is possible to accurately calculate a new zero. The data so set is immediately set into a zero-point correcting circuit element, such as D/A converter, in the torque sensing circuit. Thus, the process of stabilizing the output of the zero correcting circuit element having data set therein is completed before pulse waveforms of next torque signals appear.

Immediately after the zero setting data is set into the torque sensing circuit, data for correcting the sensitivity of the torque sensor is set into a sensitivity correcting circuit element, such as D/A converter, in the torque sensing circuit.

The data for sensitivity correction is previously stored in a memory within the torque sensing circuit and suitably read therefrom according to relevant conditions such as ambient temperature.

In this way, data for sensitivity correction is set immediately after data for new zero setting is set in the torque sensing circuit. The process of stabilizing the output of the circuit element to which the sensitivity correction data is set is also completed before pulse waveforms of the next torque signals appear. Thus, any error signal which may arise due to settling time of the output of a circuit element, such as D/A converter, is prevented from becoming superimposed on the pulse waveform of the next torque signal.

Next, a specific example will be given with reference to FIG. 1. Here, necessary settings made are as follows: predetermined sampling time T0=0.5 msec; number of samples n=15; predetermined number j=5. When the voltage of a torque signal value at the time of torque application is at a level of several Vs, a first set value a=400 mV, a second set value b=300 mV, and a third set value c=100 mV are set respectively.

In this case, when an impulse-like torque is applied so that the absolute value of the torque signal value Vtorque(t) is more than 400 mV, torque measurement is initiated. After the initiation, sampling measurement of torque signal value Vtorque(t) is made fifteen consecutive times for each predetermined time 0.5 msec. Torque signal values in this case are taken as Vtorque($t_1$), Vtorque($t_2$), . . . , Vtorque($t_{15}$).

When the absolute value of torque signal value Vtorque(t) becomes lower than the second set value 300 mV with time, an average of five torque signal values including Vtorque($t_5$), Vtorque($t_6$), . . . , Vtorque($t_9$) whose absolute values are lower than the third set value 100 mV, of subsequent signal values Vtorque($t_4$), Vtorque($t_5$), . . . , Vtorque($t_{15}$), is calculated. Immediately after that, the average value, as new zero data, is set into the zero correcting circuit element, such as D/A converter, in the torque sensing circuit.

In this way, torque signal value measurement is made for calculation of a zero and such data is set into the zero correcting circuit element, so that any zero drift in torque signal values at the impulse tool build-in type torque sensor can be accurately corrected. Furthermore, as described above, torque signal values lower than the third set value c or the smallest set value are selected and new zero data is obtained from the average of those values. This enables correction of zero without any process of synchronization with pulse-like torque signals.

FIG. 2 shows one example of circuit arrangement of a magnetostrictive torque sensor. In the figure, numeral 10 designates a torque sensing shaft having a pair of magnetically anisotropic portions 12, 12 formed on its outer periphery, the magnetically anisotropic portions being inclined in opposite directions from each other relative to the axis of the shaft. Around the magnetically anisotropic portions 12, 12 there are disposed a pair of sensing coils 14, 14 and a pair of excitation coils 16, 16 in corresponding relation to the magnetically anisotropic portions 12, 12. The exitation coils 16, 16 are connected to an oscillation circuit 18 for supply of alternating current.

Output lines from respective sensing coils 14, 14 are connected to a differential amplifier 22 via rectification circuits 20, 20. Output line from the differential amplifier 22 is connected through a filter 2 to a differential amplifier 26. To this differential amplifier 26 is input zero data for zeroing sensor output when there is no torque acting on the shaft 10, via a D/A converter 30 with a constant voltage generating circuit 28 provided in association therewith.

Output line from the differential amplifier 26 is connected to a D/A converter 32 for sensitivity correction. Shown by 34 is a torque signal line on which the above described torque signal values appear.

Output line from a CPU 36 is connected to the both D/A converters 30, 32. A memory 38 is provided in association with the CPU 36. Also, a data input/output line 20 is connected to the CPU 36. Shown at 22 is a temperature sensor whose output line is connected to the CPU 36 via the A/D converter 44. Numeral 26 designates a feedback line which is connected to the CPU 36 through the A/D converter 48 from the torque signal line 34.

According to such arrangement, torque signal values appearing on the torque signal line 3 are input to the CPU 36 through feedback line 46 for computation processing. In the above described manner, zero data are calculated to correct any zero deviation due to the presence of hysteresis and/or any zero drift arising from ambient temperature change or the like, and such zero data is input to the differential amplifier 26 through D/A converter 30.

The memory 38 has data already stored therein for sensitivity correction. Data for sensitivity correction is read from the memory 38 by the CPU 36 according to conditions such as ambient temperature. The data is sent to the D/A converter 32 in which sensitivity correction and/or correction of any sensitivity change due to temperature change is made.

Figure 6:
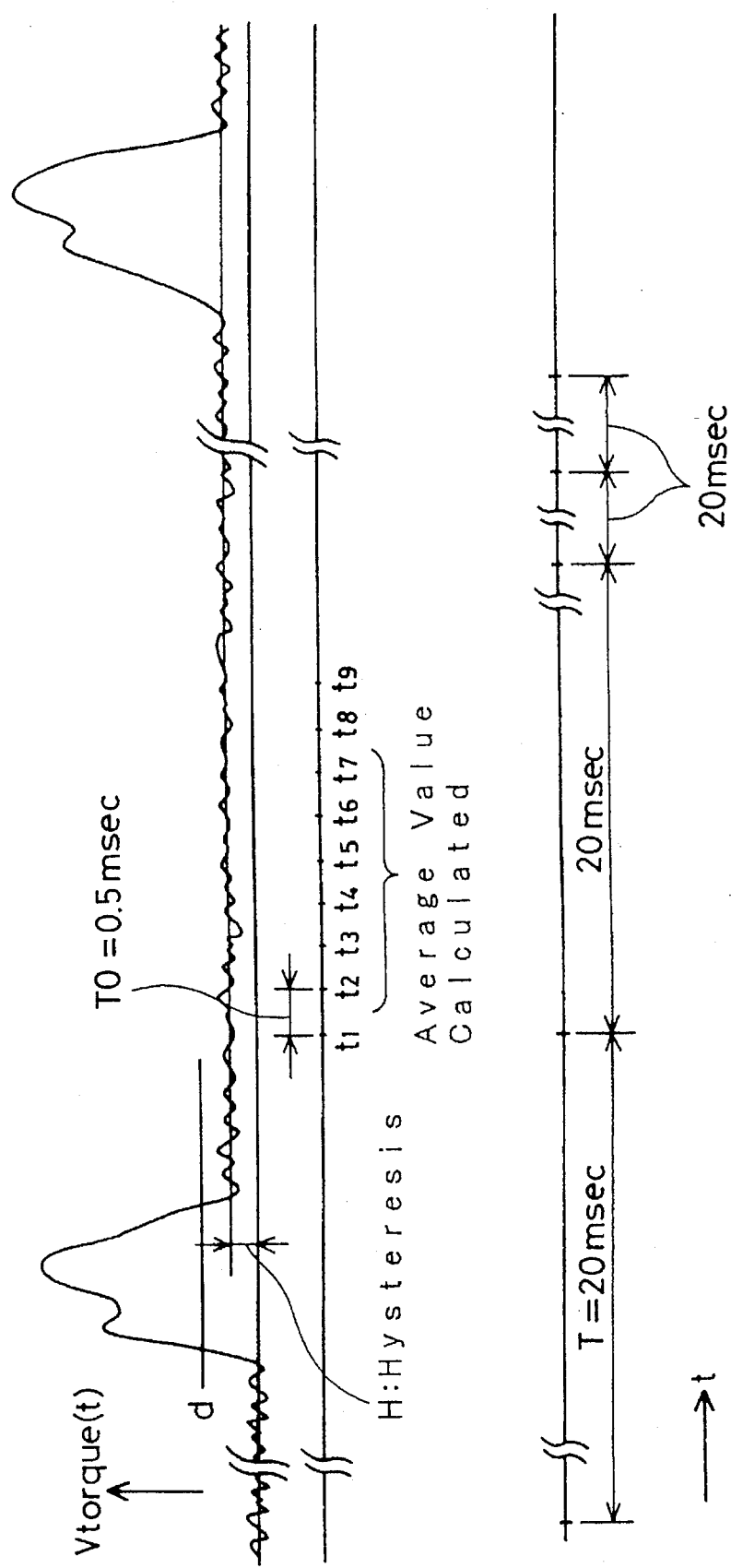
FIG. 6 is a diagrammatic view illustrating an aspect of zero fluctuations due to a deviation caused by hysteresis to a torque signal value at a point of time when any impulse-like torque is not applied, for explaining a second embodiment of the method for zero correction at torque sensor according to the present invention.

FIG. 6 shows a second embodiment of the method according to the invention. It can be seen from FIG. 6 that some deviation due to hysteresis has occurred with torque signal values when no impulse-like torque is applied. For the sake of clarity, hysteresis H is shown in exaggeration. Unless zero point correction is made in this case, errors will be caused to torque measurements.

Next, method of zero correction will be explained. Torque measurement is initiated for each predetermined period T, and during the predetermined period T following a predetermined period T having an impulse-like torque, a sample measurement of torque signal values Vtorque(t) is carried out n times in succession with a predetermined sampling time T0. Torque signal values in this case are taken as $Vtorque(t_1), Vtorque(t_2), \ldots, Vtorque(t_n)$.

When respective torque signal values $Vtorque(t_1), Vtorque(t_2), \ldots, Vtorque(t_n)$ are lower than a predetermined value d, an average value of torque signal values $Vtorque(t_i), Vtorque(t_{i+1}), \ldots, Vtorque(t_{n-j+1}) [i \geq 1, j \geq 1]$ is set as a new zero. Torque signal values vary between positive and negative according to the direction of torque application.

When the absolute value of a torque signal value exceeds a predetermined value d, any new zero setting is not carried out.

Where, in the above setting, i=1 and j=1, all sampled torque signal values are used for average computation. Where i is set to value 2 or above, an average of a large number of torque values excepting the first few is calculated. Where j is set to value 2 or above, an average of a large number of torque signal values excepting the last few is calculated. In effect, i and j are both set at 2 or more so that a plurality of torque signal values other than first and last small portions of said large number of torque signal values, that is, those torque signal values which embrace median portions only of said large number of torque signal values, are used to calculate a new zero point. This ensures use of data of smaller absolute value for accurate calculation of new zero.

Next, a specific example will be given with reference to FIG. 6. Here, necessary settings made are as follows: period T=20 msec; predetermined sampling time T0=0.5 msec; number of samples n=9; i=3, j=3. When the voltage of a torque signal value at the time of torque application is at a level of several Vs, constant value d=100 mV.

In this case, torque measaurement is initiated at constant period of 20 msec. After the initiation, sampling measurement of torque signal value Vtorque(t) is made nine consecutive times with a predetermined sampling time of 0.5 msec. Results of sampling measurements are stored in memory through A/D conversion or otherwise. Torque signal values in this case are taken as $Vtorque(t_1), Vtorque(t_2), \ldots, Vtorque(t_9)$.

Where absolute values of these torque signal values are less than 100 mV, five datas including torque signal values $Vtorque(t_3), Vtorque(t_4), \ldots, Vtorque(t_7)$ are averaged, and the average value is taken as a new zero which is used in measuring the magnitude of torque applied from subsequent torque signal values.

Thus, any such deviations of zero due to the presence of hysteresis H as shown in FIG. 6 are corrected and subsequent applied torque values can be accurately measured. In this way, calculation of a new zero point and replacement of data are carried out using only data whose absolute value is lower than the predetermined value d. Therefore, any torque signal value representing a torque actually applied is never used as data for zero calculation. Furthermore, when the pulse waveform of a torque signal issued upon application of a torque is not in synchronization with initiation of torque measurement, the method of the present invention allows a new zero to be accurately calculated.

As stated above, a plurality of torque signal values other than first and last few of a large number of torque signal values, that is, only median portions of the large number, is used in calculating a new zero point. This permits greater accuracy in the calculation of new zero.

Furthermore, the fact that plural torque signal values are averaged for zero calculation ensures that the calculated zero value is unlikely to be influenced by ripples involved in torque signals, and this leads to accurate zero calculation.

As may be seen from FIG. 6, despite the fact that sampling is made at most tentimes or so with a predetermined period of T0= 0.5 msec, initiation of torque measurement is made for each comparatively long cycle time T=20 msec. The reason for this is that since the CPU for zero adjustment is required to carry out a number of additional processing operations, including correction of sensitivity fluctuations due to temperature changes, it is necessary to secure time for such additional operations.

Figure 7:
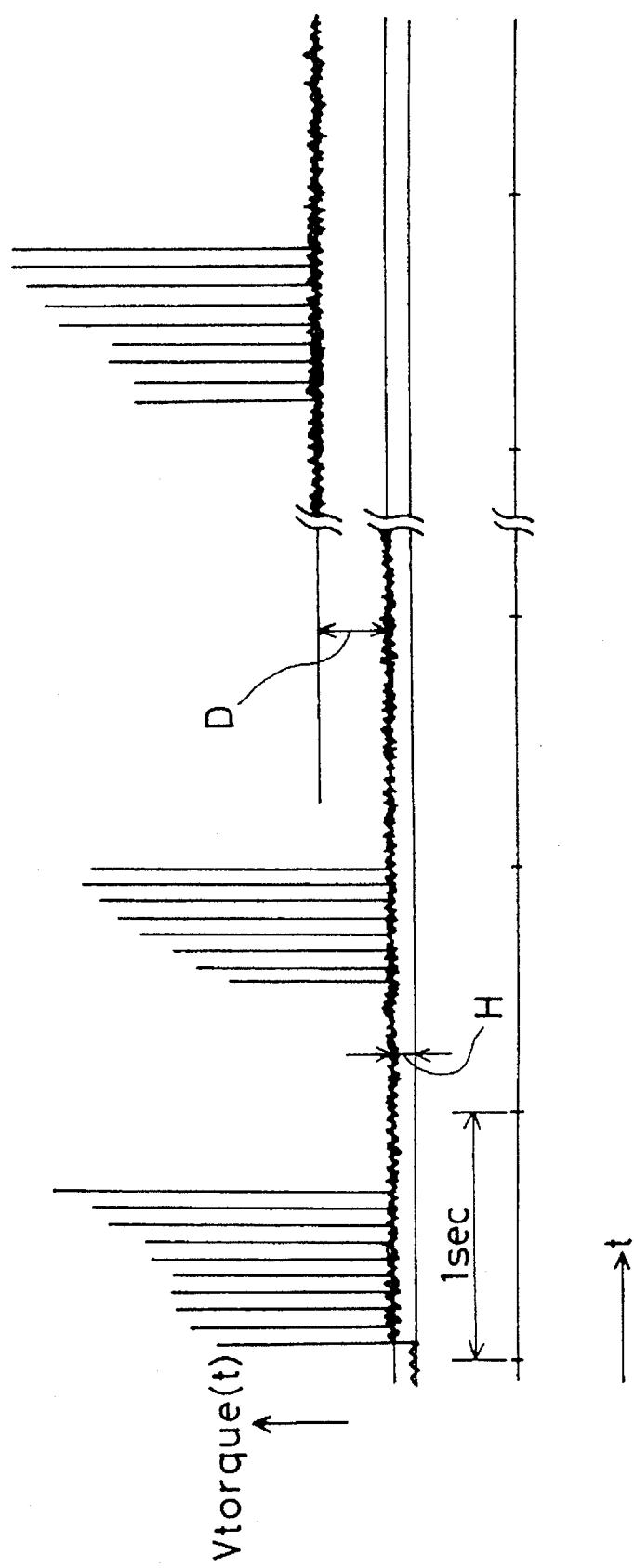
FIG. 7 is a view showing a condition in which the time axis is more constricted as compared with the FIG. 6 condition, with a zero drift being shown which arises from ambient temperature changes.

FIG. 7 shows that the transverse axis or time axis is in an extremely constricted condition as compared with that shown in FIG. 6. Besides hysteresis H, zero point drifts D arising from changes in ambient temperature are also shown. For clarity's sake, hysteresis H and zero drift D are shown in exaggeration. As FIGS. 6 and 7 show, according to the invention, a new zero point is calculated and zero correction is made for each predetermined cycle time T. This enables correction of not only zero shift due to hysteresis H, but also zero shift due to zero drift D.

Figure 8:
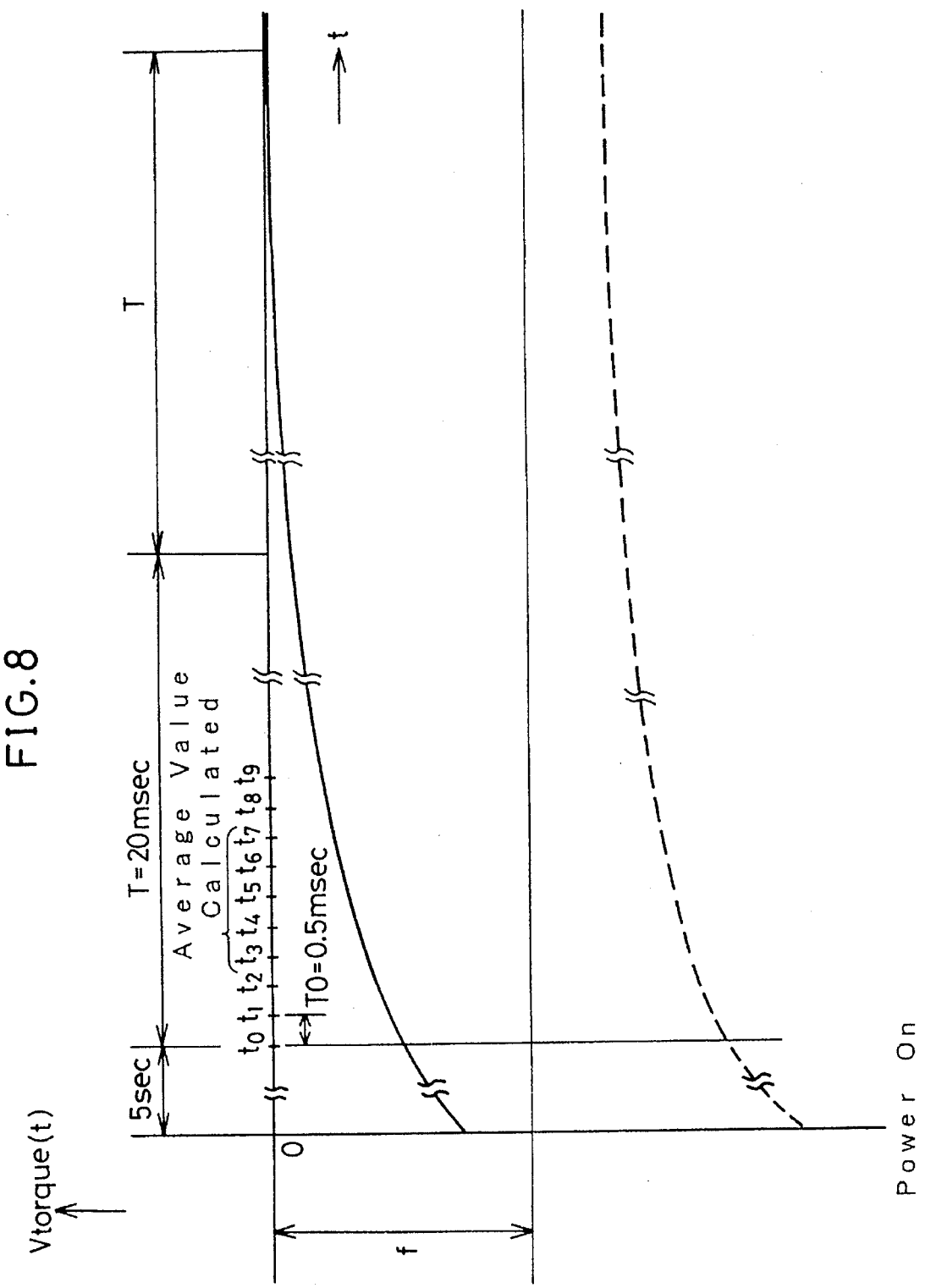
FIG. 8 is a view for explaining a third embodiment of the invention, showing a zero shift just after power on of the torque sensor.

FIG. 8 shows a third embodiment of the method according to the invention. In FIG. 8, there is shown an example of zero shift appearing immediately after the power supply for the sensor is turned on when there is no torque applied to the torque sensing shaft of the torque sensor. As shown, even in normal condition there is a possibility that zero point may become shifted by a warm-up drift.

Next, the method of correcting such shifted zero point will be described. First, the power for the torque sensor is turned on. Then, after the lapse of predetermined time $t_o$, torque measurement is initiated. Sampling measurements of torque signal values Vtorque(t) is carried out n times in succession with a predetermined period T0. Torque signal values in this case are taken as Vtorque($t_1$), Vtorque($t_2$), ..., Vtorque($t_n$).

First, the n number of sample measured torque signal values is examined as to whether the difference between maximum value thereof and minimum value thereof is lower than preset value e. That is, $$[\max.\{Vtorque(t_1), Vtorque(t_2), \ldots, Vtorque(t_n)\} - \min.\{Vtorque(t_1), Vtorque(t_2), \ldots, Vtorque(t_n)\}] \leq e.$$

When this inequality holds, an average value M is calculated with respect to torque signal values Vtorque($t_i$), Vtorque($t_{i+1}$), ..., Vtorque($t_{n-j+1}$) [$i \leq 1, j \leq 1$]. Further, the absolute value of this average value M is examined whether or not it is lower than preset value f, and if lower than the value f, the average value M is set as a new zero. In this way, it is possible to positively prevent occurrence of any zero error arising from such zero shift just after the power for the torque sensor being turned on as shown in FIG. 8.

Where the absolute value of average value M exceeds preset value f, it is possible to determine that abnormality is present in zero shift as shown by broken line in FIG. 8. In this case, therefore, new zero setting is not made.

Where the difference between the maximum and minimum values of torque signal values exceeds preset value e, there is a possibility that torque is applied. No new zero setting is made in that case either. After lapse of given time T, torque measurement is initiated again in like manner.

After that, it is possible that zero shift may persist as shown in FIG. 8 and, therefore, aforesaid operation is repeated for each given cycle T until zero correction has been completed.

Next, a specific example will be described. Here, predetermined time $t_0$=5 sec; time for sampling $T_0$=0.5 msec; cycle T=20 msec; number of samples n=9; i=3, j=3. When the voltage of a torque signal value at the time of torque application is at a level of several Vs, set value e=200 mV and set value f=1000 mV.

Power for the torque sensor is turned on and, after lapse of time $t_o$=5sec, torque measurement is initiated. Sampling measurement of the torque signal value Vtorque(t) is carried out nine consecutive times with a predetermined period T0=0.5 msec. Results of sampling measurements are stored in memory through A/D conversion or otherwise. Torque signal values in this case are taken as Vtorque($t_1$), Vtorque($t_2$), ..., Vtorque($t_9$).

Maximum and minimum values of these torque signal values Vtorque($t_1$), Vtorque($t_2$), ..., Vtorque($t_9$) are sought, and when the difference between the maximum and minimum values is smaller than set value e=200 mV, an average value M of 5 data including torque signal values Vtorque($t_3$), Vtorque($t_4$), ..., Vtorque($t_7$) is calculated. When the absolute value of the average value M is lower than set value f=1000 mV, the average value is taken as a new zero and measurement is made of the magnitude of applied torque from subsequent torque signal values.

Where the absolute value of average value M exceeds f=1000 mV, the zero point is judged to be abnormal and no zero correction is made pending the lapse of cycle time T=20 msec. In this case, zero abnormality of the torque sensor can be detected at a controller to which the torque sensor is connected. Where the difference between the maximum and minimum values of torque signal values Vtorque($t_1$), Vtorque($t_2$), ..., Vtorque($t_9$) exceeds set value e=200 mV, judgment is made that torque is applied. In this case, no zero correction is made, pending the lapse of cycle time T=20 msec.

Subsequently, after completion of zero correction, the foregoing operation is repeated for each cycle time T=20 msec until operation proceeds to ordinary measurement routine.

Any zero error present when the power for the torque sensor is turned on is detected in this way, so that abnormal zero shift of the torque sensor can be properly detected. Where there has occurred no abnormal zero shift, the zero shift present when power is turned on may be properly corrected. In a torque sensor incorporated in an impulse tool producing such waveform of torque as shown in FIGS. 3 and 4, usually no torque is applied to the tool at a point of time right after the power for the torque sensor is turned on and, therefore, zero errors resulting from a zero shift at the time of power on may be corrected in same way as described above.

Figure 9:
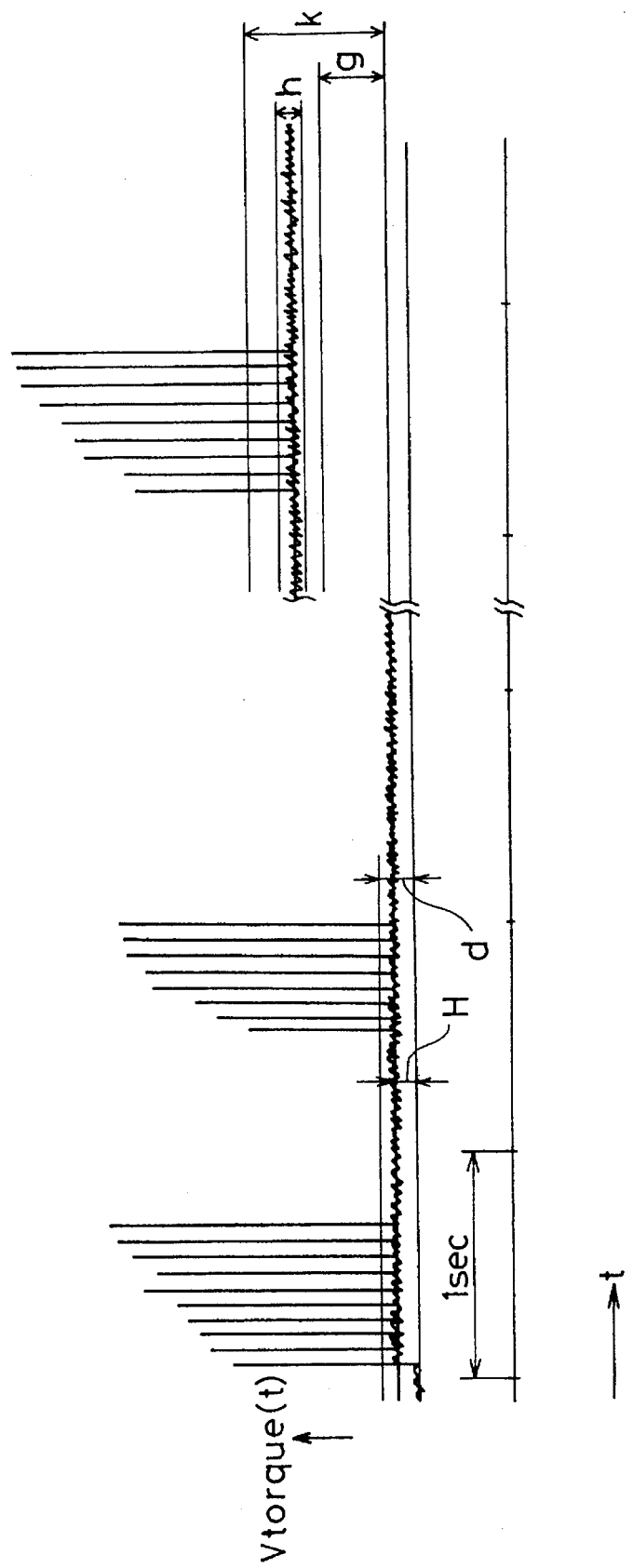
FIG. 9 is a view for explaining a fourth embodiment of the invention, showing an impulse-shaped torque signal waveform as seen when the zero of the torque sensor is considerably changed.

Only when the difference between maximum and minimum values of sample-measured torque signal values is lower than set value e, the average value M is set as zero. Therefore, if torque is applied immediately after the power is turned on with the result that the difference between the maximum and minimum values becomes greater, no zero correction is made. When torque load has ceased and torque signaling has been stabilized, it is possible to accurately correct the zero by using only such data as may be then available. FIG. 9 illustrates a fourth embodiment of the method of the present invention. In same way as in the example shown in FIG. 6, torque measurement is initiated for a given cycle time T, and by this torque measurement initiation, sampling measurement is made of torque signal values Vtorque(t) n times in succession for a predetermined time period T0.

When absolute values of individual torque signal values Vtorque($t_1$), Vtorque($t_2$), ..., Vtorque($t_n$) are lower than constant value d, an average value of torque signal values Vtorque($t_i$), Vtorque($t_{i+1}$), ..., Vtorque($t_{n-j+1}$) [$i \leq 1, j \leq 1$] is set as a new zero. When there is present a torque signal value whose absolute value is in excess of constant value d, no setting of new zero will be made according to this method.

As can be seen from FIG. 9, a set value g larger than constant value d (normally $g \geq d$) is set. Also, set value h and set value k (k>h) are set as shown.

In the event that the torque sensor is dropped or subjected to impact while in use, if there occurs any substantial zero change such that all absolute values of subsequently sample-measured torque signal values Vtorque($t_1$), Vtorque($t_2$), ..., Vtorque($t_n$) exceed set value d, zero point correction is made in the following way.

First, the plurality of sample measured torque signal values is examined as to whether the difference between maximum value and minimum value is lower than preset value h. That is, $$[\max.\{Vtorque(t_1), Vtorque(t_2), \ldots, Vtorque(t_n)\} - \min.\{Vtorque(t_1), Vtorque(t_2), \ldots, Vtorque(t_n)\}] \leq h.$$

When this inequality holds, and when absolute values of torque signal values of Vtorque($t_1$), Vtorque($t_2$), ..., Vtorque($t_n$) are all lower than set value k, average value of torque signal values Vtorque($t_i$), Vtorque($t_{i+1}$), ..., Vtorque($t_{n-j+1}$) [$i \geq 1, j \geq 1$] is set as a new zero.

Next, a specific example will be described. Here, cycle time T=20 msec; given time for sampling T0=0.5 msec;

number of samples n=9; i=3, j=3. When the voltage of a torque signal value at the time of torque application is at a level of several Vs, constant value d=100 mV, set value g=150 mV, set value h=150 mV and set value k=400 mV.

Torque measurement is initiated for each cycle time of 20 msec. Sampling measurement of torque signal value Vtorque(t) is carried out nine consecutive times for each predetermined time T0=0.5 msec. Results of sampling measurements are stored in memory through A/D conversion or otherwise. Torque signal values in this case are taken as Vtorque($t_1$), Vtorque($t_2$), . . . , Vtorque($t_9$).

When the absolute value of the torque signal values are lower than constant value d=100 mV, five data including Vtorque($t_3$), Vtorque($t_4$), . . . , Vtorque($t_7$) are averaged, and the average value is taken as a new zero and measurement is made of the magnitude of applied torque from subsequent torque signal values.

In this way, any zero deviation due to the presence of zero drift H caused by hysteresis as shown in FIGS. 6 and 9 can be corrected and subsequent measurement of applied torque value can be accurately carried out.

In the event that the torque sensor is dropped or subjected to impact while in use, if, as a result, there occurs any substantial zero change such that all absolute values of subsequently sample-measured torque signal values Vtorque($t_1$), Vtorque($t_2$), . . . , Vtorque($t_n$) exceed 100 mV, the difference between maximum and minimum values of these torque signal values Vtorque($t_1$), Vtorque($t_2$), . . . , Vtorque($t_n$) is calculated.

When this difference is smaller than set value h=150 mV and when absolute values of these torque signal values Vtorque($t_1$), Vtorque($t_2$), . . . , Vtorque($t_9$) are all smaller than set value k= 400 mV, the average value of torque signal values Vtorque($t_3$), Vtorque($t_4$), . . . , Vtorque($t_7$) is set as a new zero.

In this way, only when the difference between maximum and minimum values of the predetermined number of sample-measured torque signal values is lower than set value h=150 mV, the average value is set as a new zero. Therefore, even when the maximum value of torque signals is greater due to torque application, such torque signal values are not taken as a basis for zero calculation. Only data based on zero fluctuations under stable torque signal condition is used as such a basis, and this permits accurate zero setting.

Only when absolute values of the predetermined number of sample-measured torque signals are all smaller than set value k= 400 mV, an average value thereof is set as a new zero. Therefore, in the event that very large changes in zero should occur due to dropping or impact, no zero correction is carried out and such abnormal condition of the torque sensor can thus be communicated to external instruments.

A new zero is calculated in a predetermined cycle T for zero correction. Therefore, any zero change H due to hysteresis, ambient temperature changes or the like can be accurately cancelled. Further, since a plurality of torque signals is averaged for zero calculation, the calculation is unlikely to be influenced by any ripples involved in torque signals, which fact permits accurate zero calculation.

Figure 10:
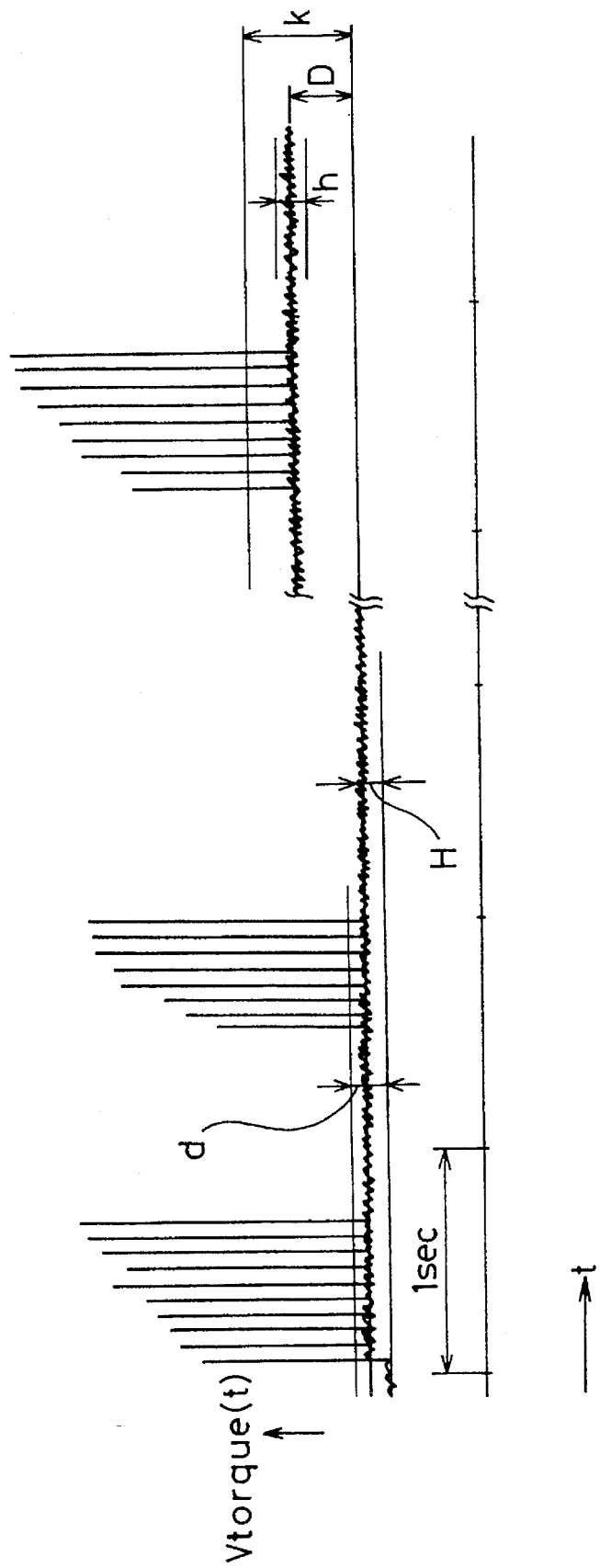
FIG. 10 is a view for explaining a fifth embodiment of the invention, showing a narrow range of zero changes and a wide range of zero changes which have occurred to the torque sensor when subjected to impulse-shaped torque.

FIG. 10 shows a fifth embodiment of the method of the invention. In the same way as in the embodiment illustrated by FIG. 6 when absolute values of individual torque signal values Vtorque($t_1$), Vtorque($t_2$), . . . , Vtorque($t_n$) are respectively lower than a predetermined value d, the average of torque signal values Vtorque($t_i$), Vtorque($t_{i+1}$), . . . , Vtorque($t_{n-j+1}$) [i≧1, j≧1] is set as a new zero. When absolute values of such torque signals are greater than predetermined value d, no new zero setting is carried out.

A specific example will be explained with reference to FIG. 6. If absolute values of torque signal values have failed n=9 consecutive times to be lower than predetermined value d=100 mV within a first cycle T=20 msec, sample measurement of torque signal values will be similarly carried out within the next cycle. If, for a predetermined time T1=1 sec shown in FIG. 10 after the start of torque measurement, absolute values of torque signals fall below the predetermined value d=100 mV, n=9 times in succession, zero correction is carried out as above mentioned.

FIG. 10 shows the transverse axis or time axis being extremely constricted as compared with the case of FIG. 6. In the figure there is shown, besides usual zero changes H, a substantial zero point change D due to the torque sensor being dropped or subjected to impact in use. The manner of zero point correction in this case will be explained below.

For the purpose of correction in the instance of the FIG. 6, if absolute values of torque signal values fail to become lower than the predetermined value d in predetermined time T1=1 sec shown in FIG. 10 after the start of torque measurement, torque measurement is started again. In this case, sampling measurement of torque signal values is carried out n times in succession for each predetermined time period T0.

First, the difference between the maximum and minimum values with respect to n-number of sample-measured torque signal values is examined as to whether or not it is smaller than the set value h. That is, the following relation is examined:

$$[\max.\{Vtorque(t_1), Vtorque(t_2), \ldots, Vtorque(t_n)\} - \min.\{Vtorque(t_1), Vtorque(t_2), \ldots, Vtorque(t_n)\}] \leq h$$

When this inequality holds, average value M of torque signal values Vtorque($t_i$), Vtorque($t_{i+1}$), . . . , Vtorque($t_{n-j+1}$) [i≧ 1, j≧1] is calculated. Further, the absolute value of this average value M is examined whether or not it is lower than preset value K, and if lower than the value K, the average value is set as a new zero.

When the absolute of average value M is greater than set value K, it is judged that zero change D is in abnormal condition. In this case, therefore, no new zero-point setting is made. When the difference between the maximum and minimum values of torque signals is greater than set value h, possibly torque is being applied, in which case no new zero setting is made either. In such case, after lapse of predetermined time T, torque measurement is initiated again in same manner as above described. After that, the foregoing operation is repeated for each predetermined cycle time T until zero correction is completed, because zero point may possibly continue to fluctuate.

Next, a specific example will be explained. It is assumed that sampling time T0=0.5 msec, cycle T=20 msec, number of samples n=9, and i=3, j=3. When the voltage of a torque signal value at the time of torque application is at a level of several Vs, set value h=200 mV and set value k=1000 mV.

When the difference between the maximum value and minimum value of sample-measured torque signal values Vtorque($t_1$), Vtorque($t_2$), . . . , Vtorque($t_n$) is below set value h=200 mV, average M of five datas including Vtorque($t_3$), Vtorque($t_4$), . . . , Vtorque($t_2$) is calculated. When the absolute value of the average value is lower than set value k=1000 mV, that value is talen as a new zero for measurement of the magnitude of torque applied with respect to subsequent torque signal values.

When the absolute value of average value M is greater than set value k=1000 mV, it is judged that zero point is abnormal, and no zero correction is made, pending the lapse of cycle time T=20 msec. In this case, the zero abnormality can be detected at the controller to which the torque sensor is connected. When the difference between the maximum value and minimum value of sample-measured torque signal values Vtorque($t_1$), Vtorque($t_2$), ..., Vtorque($t_n$) is greater than set value h=200 mV, it is judged that torque is being applied, and no zero correction is made, pending the lapse of cycle time T=20 msec.

Subsequently, the foregoing operation is repeated for each cycle time T=20 msec until the process of zero correction is completed and operation proceeds to ordinary measurement routine.

In this way, detection is made whether or not the absolute value of average value M is greater than set value k=1000 mV, so that any occurrence of such zero point abnormality is properly detected and, when there is no such abnormality, any large zero point fluctuation D can be properly corrected. With a torque sensor incorporated in an impulse tool which produces such torque waveform as is shown in FIGS. 3 to 5, such zero point error can be corrected by selecting for such correction any time when the sensor is not loaded with torque.

Only when the difference between the maximum and minimum values with respect to sample-measured torque signal values is lower than set value h, average value M of the torque signal values is set as a new zero. Therefore, when the maximum value is exceptionally large because of the fact that the sensor is loaded with torque, zero point correction is not carried out. Thus, it is possible to positively effect zero correction using data available when there is torque signal stability with no torque being applied.

Figure 11:
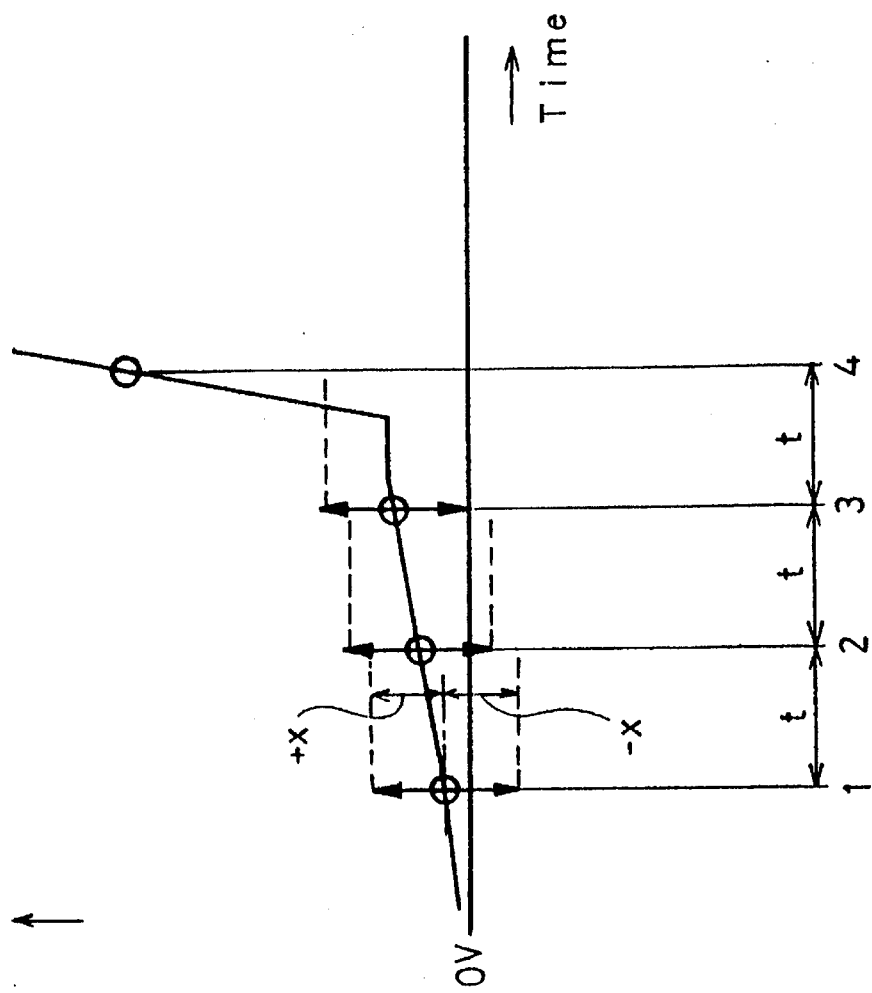
FIG. 11 is a view showing one example of a torque curve for explaining conditions for recognition of torque applied in accordance with a sixth embodiment of the invention.

FIGS. 11 to 17 show a sixth embodiment of the method of the present invention. In FIG. 11, the transverse axis represents time and the ordinate axis represents measurements. Measurement is made by beginning from time 1 and in a predetermined period t. The sampling period t is set in such a way that it is shorter than the shortest duration of torque applied. Where the number of successive sampling times is n, n×t is set in such a way that it is longer than the longest duration of torque applied. Limits of the magnitude of torque varying within a unit time is set to be a given value ±x.

In FIG. II, torque measurement is initiated at time 1 and is carried out for each given time t. At time 2, measured torque value is still within given value ±x as compared with time 1 condition. Therefore, no processing is made and a next measurement is made at time 3. At time B, measured torque value is still within given value ±x as compared with time 2 and, therefore, no particular processing is made. Then, next measurement is made at time 4. At time 2, measured value exceeds that at time 3 by +x Thus, it is judged that there has been torque loading.

At this point of time, measurement at time 3 and that at time are compared with each other. Since the measurement at time 3 is closer to real zero (output 0V), the measured value at time 3 is taken as reference point on the basis of next operations for zero setting.

Figure 12:
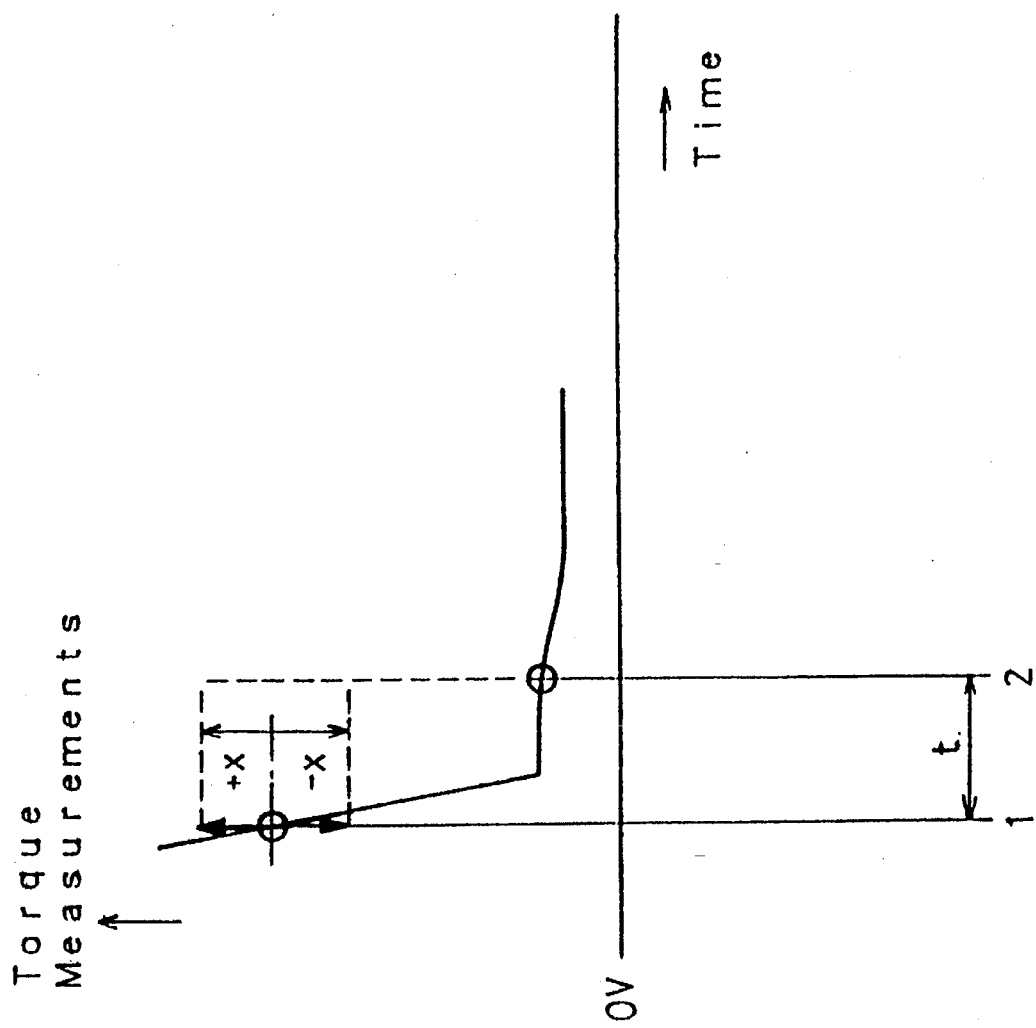
FIG. 12 is a view showing another example of torque curve for explaining conditions for recognition of torque applied.

In FIG. 12, at time 1 torque measurement for period t is carried out. At time 2, torque measurement is much smaller than that at time 1, even smaller than −x. Then, it is judged that torque is loaded. A comparison of time and time 2 in torque measurement tells that the measurement at time 2 is more closer to real zero (output 0 V). Subsequently, there-fore, the measurement at time 2 is taken as a reference point for next operations for zero setting.

According to the manner of operation as illustrated in FIGS. 11 and 12, application of torque can be recognized according to the relative "inclination" between a pair of adjacent measurement. Value ±x can be made much smaller as compared with set values c, d, h in the foregoing examples 1 through 5. Furthermore, measured value closer to real zero is taken as reference point which enables a subsequent zero to be set. In other words, zero correction can be made on the basis of the one measured value which is in no load condition. Therefore, possible error of taking applied torque as a zero error for correction can be prevented.

Figure 13:
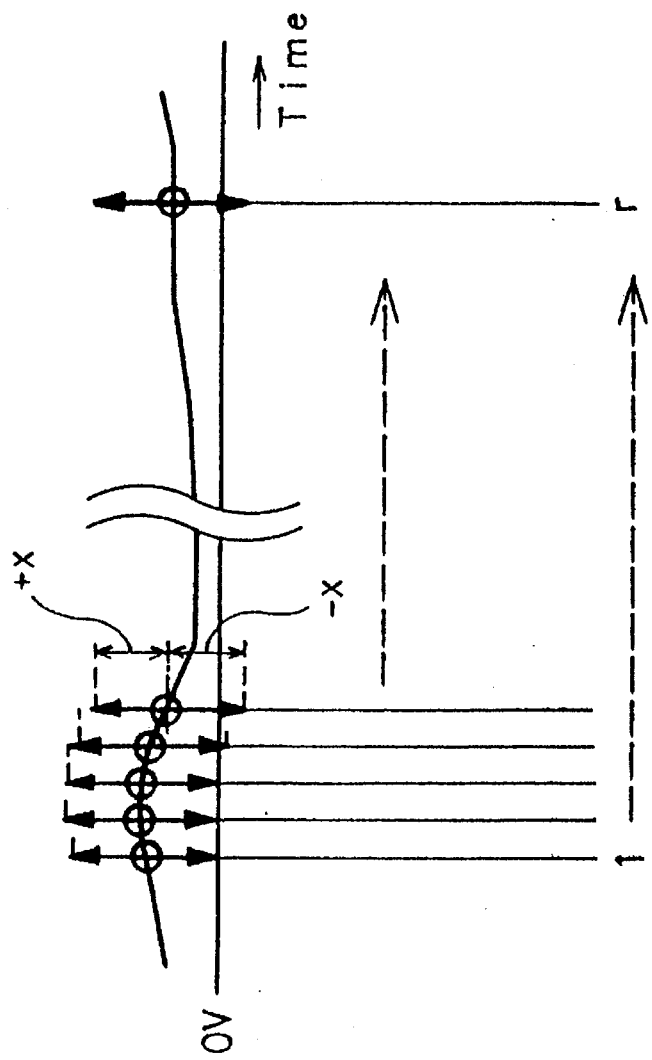
FIG. 13 is a view showing still another example of torque curve for explaining the condition as seen when no torque is applied.

In FIG. 13, measurement is likewise started at time . In this instance, adjacent measurements within the limits of ±x are made in the number of r in succession. Then, measurement operation program is reset, and similar operation is repeated. In the subsequent operations, measurement at time r is taken as reference point.

Next, measurement operation for zero correction is explained. FIG. 1 shows a case in which pulse-like torque has been applied. In this case, when measurement is started at time 1, processing conditions occur between time 1 i, and time so that measurement at time is taken as reference point. Accordingly, starting from time 1, m number of data within the limits of ±x, including the measurement at time 1, are measured. Then, average of measured values at time through m is calculated, which is in turn corrected so as for it to be taken as a zero. Since the average of m number of measurements is set as new zero in this way, accurate zero calculation is possible. For the purpose of zero correction, the foregoing given value ±x for recognition of torque loading is similarly used and, in addition to this, it is possible to use a different value ±y for the limits used to determine which measured values will be used to obtain the average value.

Figure 14:
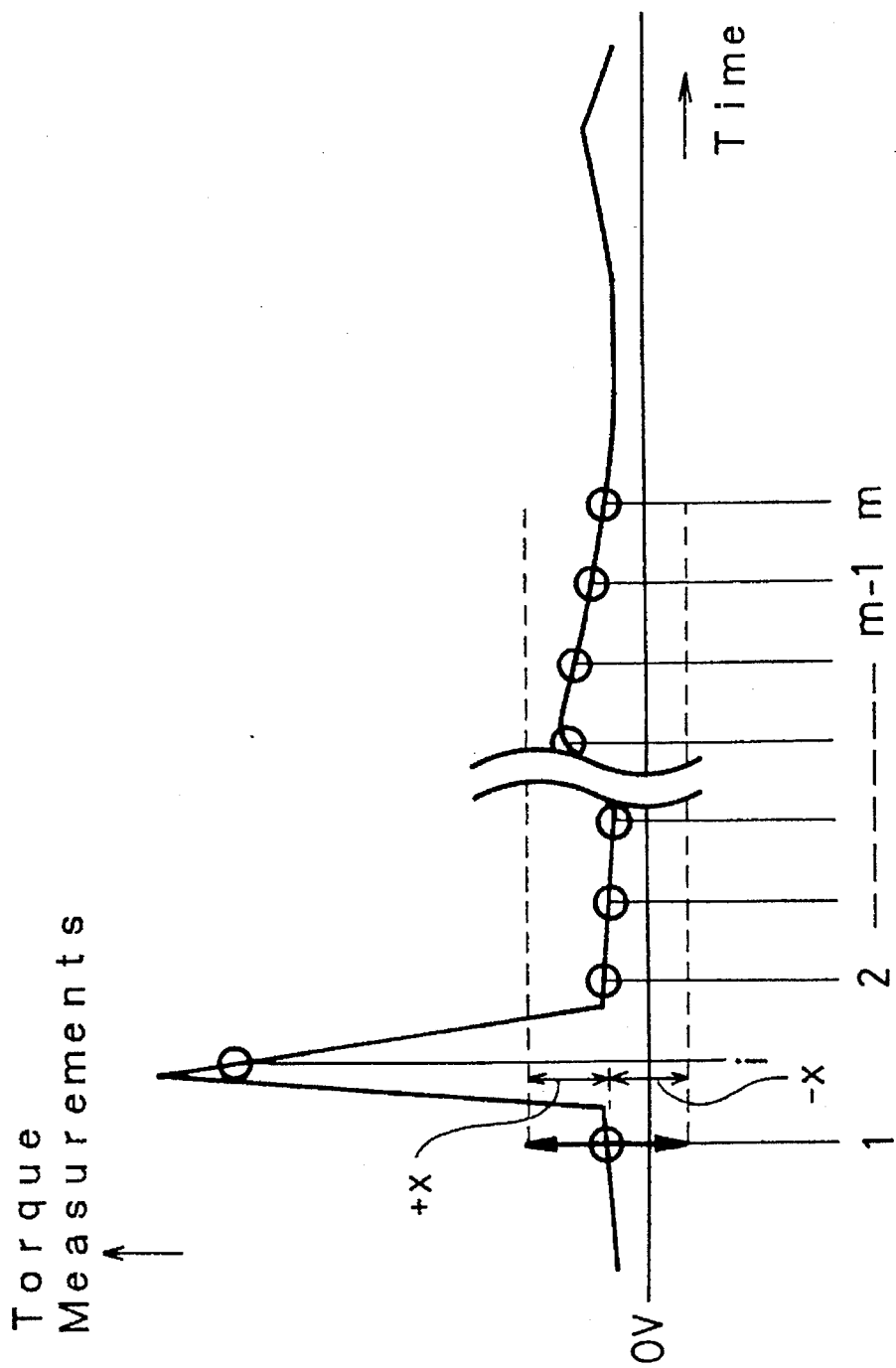
FIG. 14 is a view showing one example of measurement process for zero correction when a pulse-like torque is applied.
Figure 15:
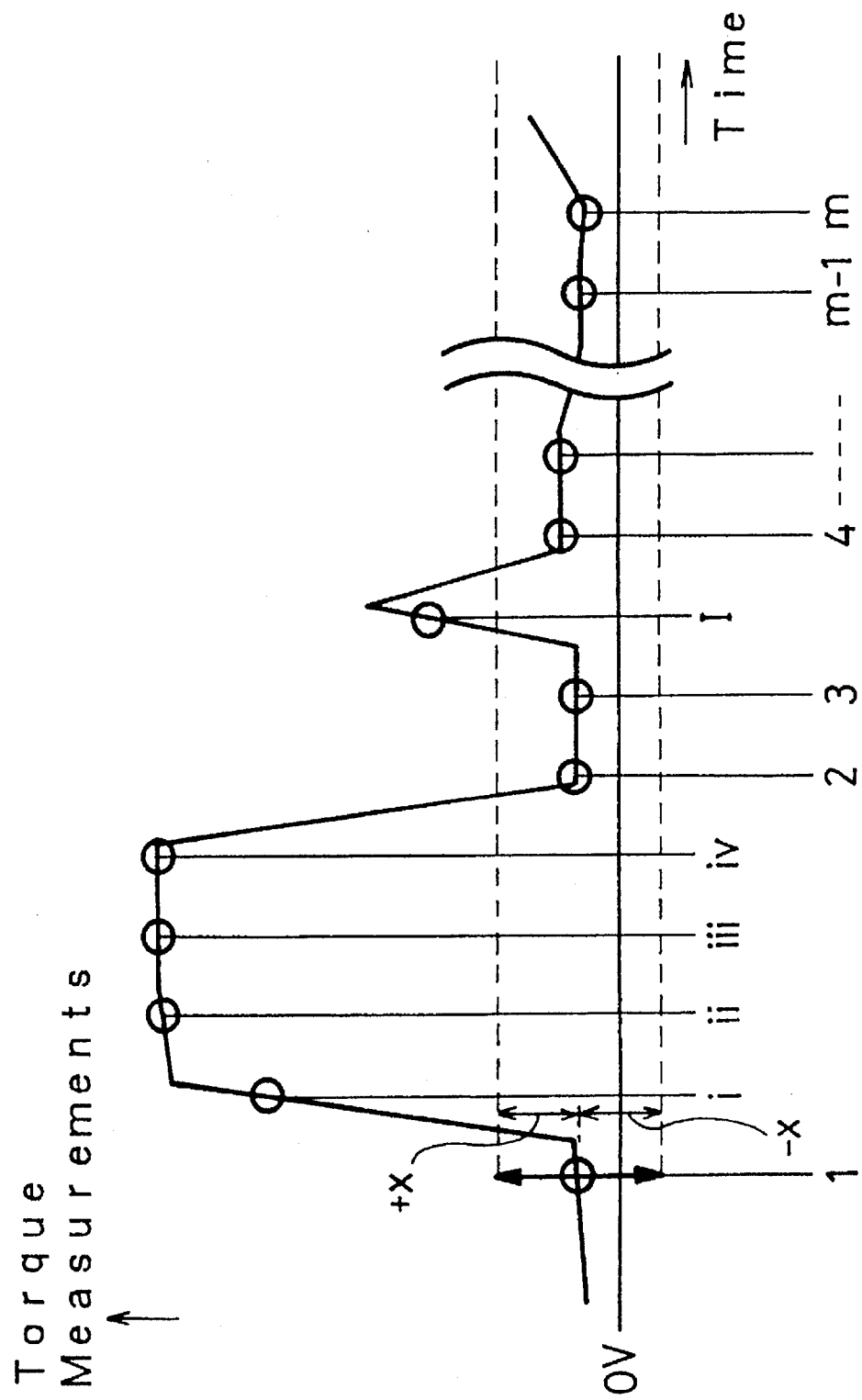
FIG. 15 is a view showing one example of measurement process for zero correction when another pulse-like torque is applied.

FIG. 15 shows an instance where the interval of torque loading time is longer than that in FIG. 14. As is the case with FIG. 14, measurement at time 1 serves as a reference point, and m number of data within the limits of ±x is measured and corrected so that an average value thereof is to be set as a new zero.

Figure 16:
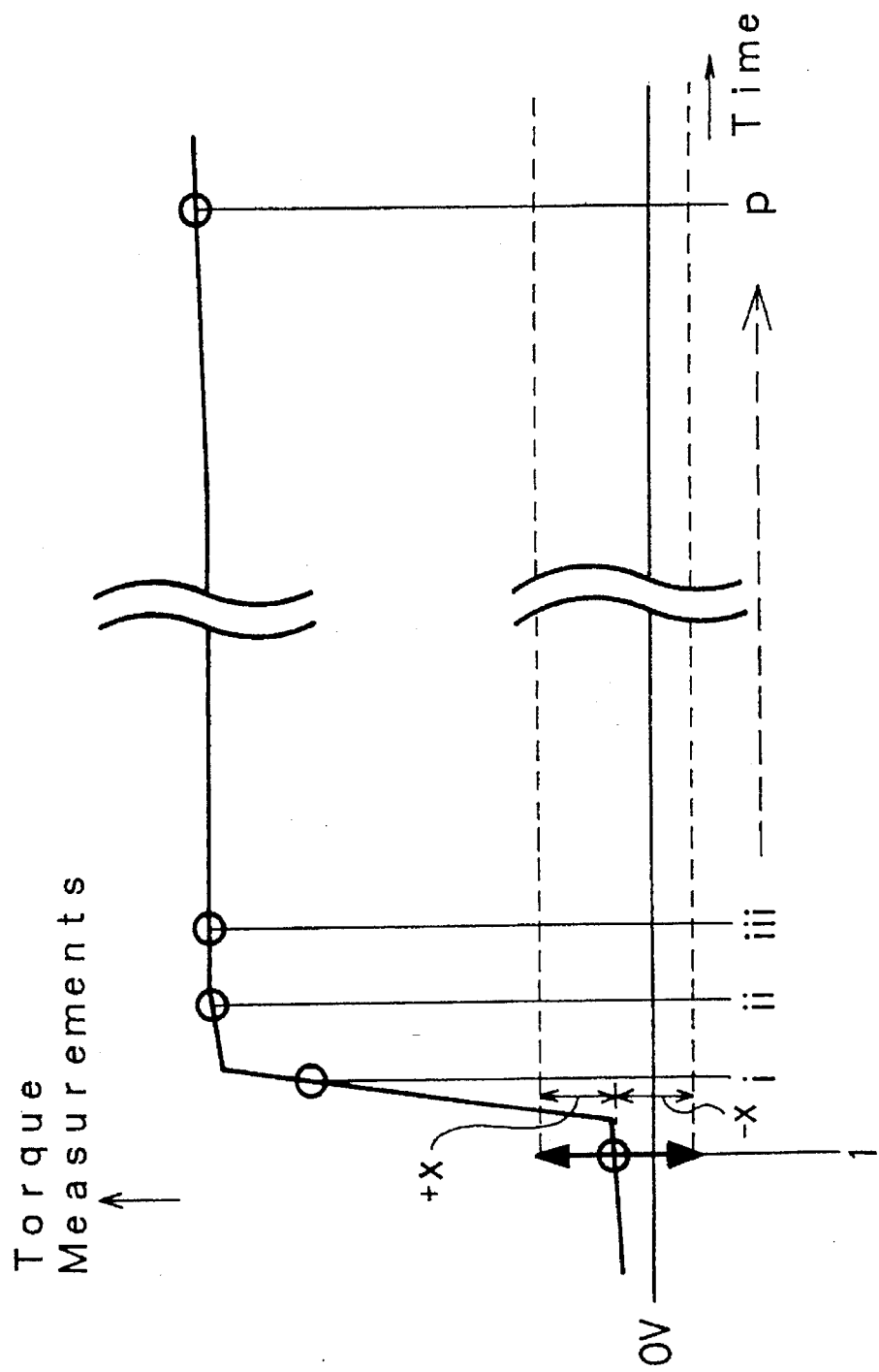
FIG. 16 is a view showing an example of measurement process for zero correction when there is a shift in zero.

FIG. 16 shows an instance in which zero point has shifted toward the plus side. Such a shift occurs due to a factor other than torque. In the present case, upon start of measurement at time 1, processing conditions develop at time 1, i and the measurement at time 1 is taken as reference point. Measured values in excess of +x relative to the reference point, including the measurement at time i, are taken in p-number in succession. Average value of data at (p−m+1) through time p, that is, average of m-number of current measurement values, is set as a new zero on the basis of which correction is made.

Figure 17:
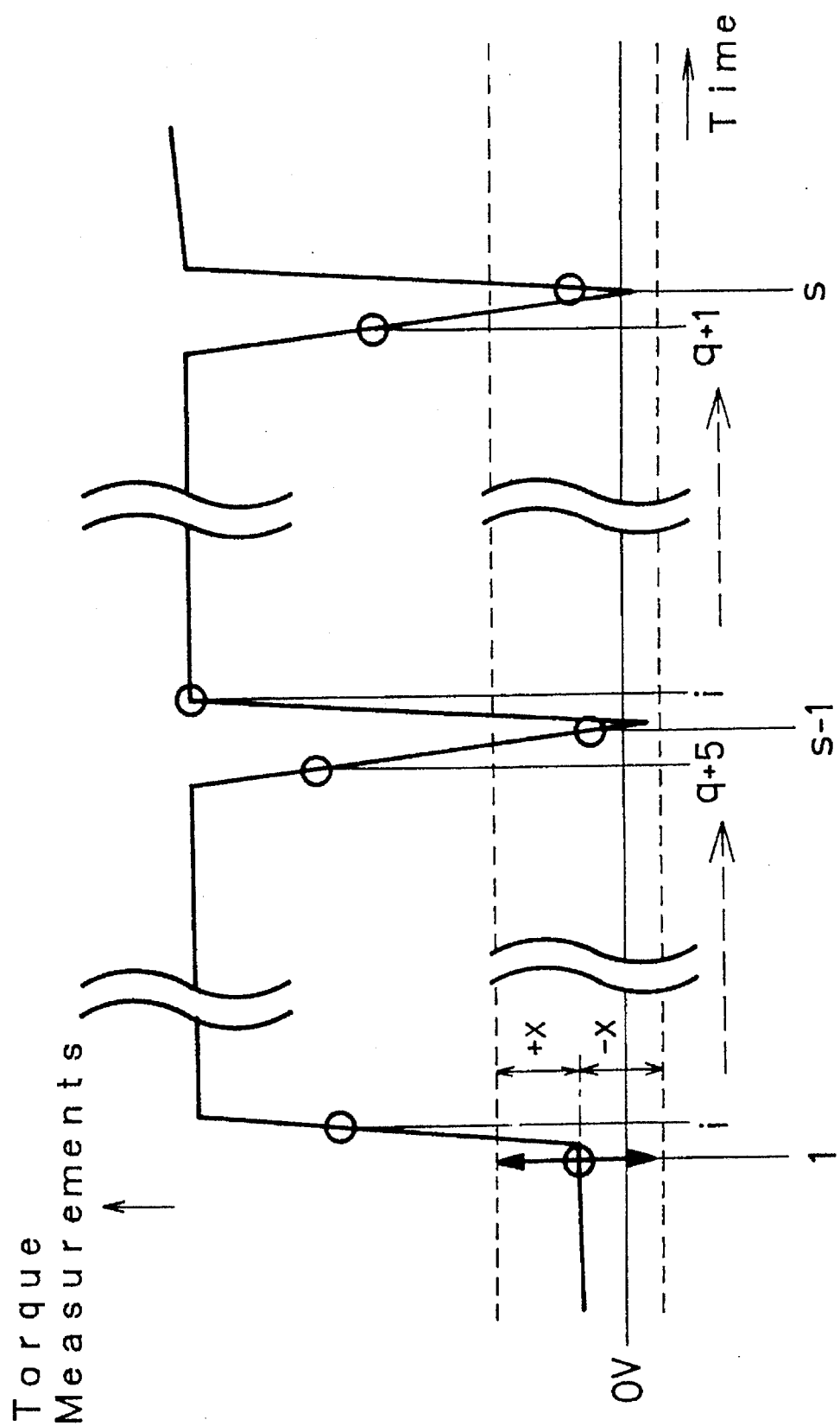
FIG. 17 is a view showing an example of measurement process for zero correction when pulse-like torques are applied in plurality when zero point has shifted to the plus side.

FIG. 17 shows a case in which zero point has shifted toward plus side as in the case of FIG. 16 and, in addition, pulse-like torques are applied in plurality toward minus side. Such a torque pattern is often seen with screw fastening pulse tools in the case of abnormality occurrence. In the present instance, processing conditions develop at time 1, i, and measurement at time 1 is taken as reference point. At and after time i, measured values in excess of+x relative to the reference point are taken in q-number in succession. It is assumed that during these q times successive measurements, next pulse-like torques have not yet been applied. For example, in the left side shift condition in FIG. 17, measurements in excess of +x relative to the reference point have occurred (q+ 5) consecutive times, and likewise in the right side shift, similar shifts have occurred (q+1) consecutive times. It is assumed that, as shown, such measurements in excess of +x relative to the reference point, made q consecutive times, occur s times. Provided that s<(m−1). Average value of data at (q− m+1) through time q, that is, average of m-number of current measurement values, is set as a new zero on the basis of which correction is made.

In the foregoing examples, the method of the invention is described as applied to a magnetostrictive torque sensor. Of course, the invention is applicable to strain gauge type sensors as well. Further, it is apparent that the method of the invention is also applicable to various other types of sensors, such as load cells and pressure sensors.

What is claimed is:

1. A method for zero correction in a torque sensor, comprising sample-measuring torque signals in predetermined time intervals (t), recognizing torques being applied when the difference between a pair of adjacent measured values is greater in absolute value than a predetermined value (±x), and using one of the pair of measured values which is closer to real zero as a reference point in setting a subsequent zero point.

2. A method for zero correction in a torque sensor as set forth in claim 1, wherein an average value for a given number (m) of measured values which is different from the reference point within predetermined limits (±x,±y) is set as a new zero.

3. A method for zero correction in a torque sensor as set forth in claim 1, wherein when values greater in absolute value than the predetermined limits (±x,±y) from the reference point are measured in a predetermined number (p) in succession, an average value for a current given number (m) of measured values of those included in the predetermined number (p) of measured values is set as a new zero.

4. A method for zero correction in a torque sensor as set forth in claim 1, wherein when, in intermittent intervals and at a plurality of times(s), values greater in absolute value than the predetermined limits (±x,±y) from the reference point are measured in a predetermined number (q) in succession, an average value for a current given number (m) of measured values of those included in the current predetermined number (q) of measured values is set as a new zero.

5. A method for zero correction in a torque sensor, said method comprising:
    selecting a first measured torque signal to commence a predetermined period of time in which the torque signals are to be measured;
    measuring the torque signals occurring during said predetermined period of time;
    selecting at least two torque signals according to at least one predetermined criterion;
    determining a selected value according to the magnitude of the at least two selected torque signals; and
    setting the zero correction according to the selected value.

6. A method for zero correction in a torque sensor according to claim 5, wherein:
    said step of selecting a first measured torque signal to commence a predetermined period of time in which the torque signals are to be measured, comprises:
        selecting a torque signal when the absolute value of a torque signal exceeds a first preset value,
    said step of measuring the torque signals occurring during said predetermined period of time, comprises:
        making sampling measurement of torque signals for a predetermined time period after the initiation;
    said step of selecting at least two torque signals according to at least one predetermined criterion, comprises:
        selecting, after the absolute value of any sample measured torque signal value is found to be lower than a second preset value, a predetermined number of those of a plurality of sampled torque signal values lower than a third preset value;
    said step of measuring a selected value according to the magnitude of the at least two selected torque signals, comprises:
        averaging said predetermined number of those of a plurality of sampled torque signals lower than said third preset value, and
    said step of setting the zero correction according to the selected value, comprises:
        setting the average value as a new zero.

7. A method for zero correction in a torque sensor as set forth in claim 6, wherein said value for zero setting is set in a torque sensing circuit immediately after the average value for the predetermined number of torque signal values is set as a new zero.

8. A method for zero correction in a torque sensor as set forth in claim 7, wherein data for correcting the sensitivity of the torque sensor is set in the torque sensing circuit, immediately after the data for zero setting is set in the torque sensing circuit.

9. A method for zero correction in a torque sensor according to claim 5, wherein
    said step of selecting a first measured torque signal to commence a predetermined period of time in which the torque signals are to be measured, comprises:
        initiating torque measurement in a predetermined cycle;
    said step of measuring the torque signals occurring during said predetermined period of time, comprises:
        measuring torque signals for a predetermined time period after the initiation;
    said step of selecting at least two torque signals according to at least one predetermined criterion, comprises:
        selecting torque signals when a predetermined number of measured torque signal values is lower than a predetermined value in their respective absolute values; and
    said step of measuring a selected value according to the magnitude of the at least two selected torque signals, comprises:
        preparing an average value of the predetermined number of torque signals; and
    said step of setting the zero correction according to the selected value, comprises:
        preparing as a new zero the average value of the predetermined number of torque signals.

10. A method for zero correction in a torque sensor as set forth in claim 9, wherein the steps of selecting the predetermined number of measured torque signal values for measurement during the predetermined time period, and preparing an average value of the predetermined number of torque signals, comprises omitting the first few torque signal values and last few torque signal values when selecting said predetermined number of measured torque signals, and preparing said average value of the predetermined number of torque signals.

11. A method for zero correction in a torque sensor according to claim 5, wherein
    said step of selecting a first measured torque signal to commence a predetermined period of time in which the torque signals are to be measured, comprises:

selecting a torque signal after lapse of a predetermined time after power is initially supplied for the torque sensor;

said step of measuring the torque signals occurring during said predetermined period of time, comprises:
measuring torque signal values for a predetermined time period after said power is initially supplied;

said step of selecting at least two torque signals according to at least one predetermined criterion, comprises:
selecting torque signal values when the difference between maximum and minimum values of the predetermined number of torque signal values is lower than a predetermined first set value, said step of measuring a selected value according to the magnitude of the at least two selected torque signals, comprises:
calculating an average value for a predetermined number of said torque signal values; and said step of setting the zero correction according to the selected value, comprises:
setting the average value as a new zero when the absolute value of the average value is lower than a predetermined second set value.

12. A method for zero correction in a torque sensor as set forth in claim 11, wherein the step of setting the zero correction according to the selected value further comprises preventing a new zero setting when the absolute value of the average value exceeds the second set value, indicating that there is zero abnormality.

13. A method for zero correction in a torque sensor as set forth in claim 12, wherein measurement of torque signal values is again initiated after a predetermined time interval, when the difference between maximum and minimum values of the predetermined number of torque signal values is greater than the first set value.

14. A method for zero correction in a torque sensor according to claim 5, wherein:

said step of selecting a first measured torque signal to commence a predetermined period of time in which the torque signals are to be measured, comprises
initiating torque measurement in a predetermined cycle;

said step of measuring the torque signals occurring during said predetermined period of time, comprises:
measuring torque signals for a predetermined time period after the initiation;

said step of selecting at least two torque signals according to at least one predetermined criterion, comprises:
selecting torque signals when the predetermined number of measured torque signal values is all greater in absolute value than a first set value and when the difference between maximum and minimum values of the predetermined number of torque signal values is lower than a second predetermined set value, and further when the predetermined number of measured torque signal values is all lower in absolute value than a third set value which is greater than the first set value;

said step of measuring a selected value according to the magnitude of the at least two selected torque signals, comprises:
preparing an average value for a predetermined number of measured torque signal values; and the step of setting the zero correction according to the selected value, comprises:
setting the average value as new zero.

15. A method for zero correction in a torque sensor according to claim 5, wherein said step of selecting a first measured torque signal to commence a predetermined period of time in which the torque signals are to be measured, comprises:
initiating torque measurement in a predetermined cycle;

said step of measuring the torque signals occurring during said predetermined period of time, comprises:
measuring torque signals for a predetermined time period after the initiation, said step of selecting at least two torque signals according to at least one predetermined criterion, comprises:
selecting torque signal values when the predetermined number of measured torque signal values is all lower in absolute value than a predetermined value; and, when absolute values of the predetermined number of measured torque signal values are not found to be lower than the predetermined value during a plurality of cycles of torque measurement initiated in the course of a predetermined time period after the first initiation of torque movement, said step of measuring a selected value according to the magnitude of the at least two selected torque signals, comprises:
preparing a first average value for a predetermined number of torque signal values, and measuring torque signals again in predetermined time intervals, calculating a second average value for the predetermined number of torque signal values when the difference between maximum and minimum values of the predetermined number of torque signal values is lower than a first set value; and said step of setting the zero correction according to the selected value, comprises:
setting the first average value for a predetermined number of measured torque signal values as a new zero, and
setting the second average value as a new zero when the absolute value of the second average value is lower than a second set value.

16. A method for zero correction in a torque sensor according to claim 5, wherein said step of selecting a first measured torque signal to commence a predetermined period of time in which the torque signals are to be measured, comprises:
selecting a first torque signal to be measured;

said step of measuring the torque signals occurring during said predetermined period of time comprises:
sample-measuring torque signals in predetermined time intervals (t), said step of selecting at least two torque signals according to at least one predetermined criterion, comprises:
recognizing torques being applied when the difference between a pair of adjacent measured values is greater in absolute value than a predetermined value ($\pm x$);

said step of measuring a selected value according to the magnitude of the at least two selected torque signals, comprises:
recognizing torques being applied, and selecting one of the pair of measured values closer to real zero; and said step of setting the zero correction according to the selected value, comprises:
setting a subsequent zero point using the selected one of the pair of measured values which is closer to real zero as a reference point.

17. A method for zero correction in a torque sensor as set forth in claim 16, wherein said step of setting a subsequent zero point comprises calculating an average value for a given number (m) of measured values which is different from said reference point within predetermined limits (±x, ±y), and setting said average value as a new zero.

18. A method for zero correction in a torque sensor as set forth in claim 16, wherein said predetermined time period for said sample-measurement of torque signals is reset when the number of samples measured has reached a given number (n).

19. A method for zero correction in a torque sensor as set forth in claim 16, wherein the steps of recognizing torques being applied when the difference between a pair of adjacent measured values is greater in absolute value than a predetermined value (±x), and of using the selected one of the pair of adjacent measured values which is closer to real zero as a reference point in setting a subsequent zero point, comprises, setting as a new zero an average value for a current given number (m) of measured values of those included in the predetermined number (p) of measured values is set as a new zero when in intermittent intervals and at a plurality of times (s), values greater in absolute value than the predetermined limits (±x,±y) from the reference point are measured in a predetermined number (p) in succession.

20. A method for zero correction in a torque sensor as set forth in claim 16, wherein the steps of recognizing torques being applied when the difference between a pair of adjacent measured values is greater in absolute value than a predetermined value (±x), and of using the selected one of the pair of adjacent measured values which is closer to real zero as a reference point in setting a subsequent zero point, comprises, in intermittent intervals and at a plurality of times (s), values greater in absolute value than the predetermined limits (±x,±y) from the reference point are measured in a predetermined number (q) in succession, an average value for a current given number (m) of measured values of those included in the current predetermined number (q) of measured values is set as a new zero.

21. A method for zero correction in a torque sensor according to claim 5, wherein said step of selecting a first measured torque signal to commence a predetermined period of time in which the torque signals are to be measured, comprises:

selecting a first measured torque signal when the value of a torque signal is outside a first predetermined range.

22. A method for zero correction in claim 21, wherein said step of selecting at least two torque signals according to at least one predetermined criterion, comprises:

selecting, from among a plurality of measured torque signals, a predetermined number of measured torque signals having torque signal values within a second predetermined range.

23. Apparatus for making zero correction in a torque sensor, said apparatus comprising:

means for selecting a first measured torque signal to commence a predetermined period of time in which the torque signals are to be measured;

means for measuring the torque signals occurring during said predetermined period of time;

means for selecting at least two torque signals according to at least one predetermined criterion;

means for determining a selected value according to the magnitude of the at least two selected torque signals; and means for setting the zero correction according to the selected value.

24. A method for zero correction in a torque sensor as set forth in claim 1, wherein when no torque application is recognized, if the number of samples has reached a given number (n), measurement operation is reset for repetition of similar operation.

* * * * *